Patented June 10, 1930

1,763,167

UNITED STATES PATENT OFFICE

HUGH LOWERY, OF ALTON, ILLINOIS, ASSIGNOR TO STANDARD OIL COMPANY, OF WHITING, INDIANA, A CORPORATION OF INDIANA

METHOD OF REVIVIFYING FULLER'S EARTH AND OTHER FILTERING CLAYS

No Drawing. Application filed May 25, 1927. Serial No. 194,237.

This invention relates to revivifying fuller's earth and other filtering clays particularly such clays which have been used in filtering mineral oils.

According to the present invention, the used clay is treated with an aqueous solution of alkali whereby a large amount of the oil and other contained matter is removed therefrom. The alkali used in commercial operation is preferably soda ash on account of cheapness, but other soluble alkalis, such as caustic soda, may be used if desired. After the alkali treatment the clay may be washed, dried, and ignited in the usual manner and is found to be substantially as effective as new clay. The revivified clay may, however, be used in moist condition, for example in the form of a pulp and in this case it is unnecessary to dry the clay after washing with aqueous alkaline solution and water as herein described. Such a pulp is suitable for use in contact filtering processes and particularly in the contact filtering process described and claimed in patent application Serial No. 163,949, filed January 27, 1927, by the present applicant and another. Furthermore, while it is preferred to wash the revivified clay, this step may be omitted, if desired, since in many cases the retention of some alkaline reagent by the dried revived clay or a pulp of the revived clay, is unobjectionable.

The method of revivifying the filtering clay is applicable equally to both the fine clays used in contact filtering and to the coarser clays used in percolation filtering. In using soda ash it is suitable to use a solution of between 5° and 25° Baumé or higher.

The following specific example is given by way of illustration. Six hundred pounds of used clay are charged to a washing tank and 140 gallons of 8° Baumé solution of soda ash are added. This quantity is sufficient to cover the charge of clay. The mixture is agitated with air and heated with both open and closed steam until the batch reaches about 185 to 210° F. The air and steam are shut off and the mass allowed to stand for about twelve hours. At the end of this time the clay has settled and the oil and organic matter are on the surface. The oil and excess soda ash solution are pumped off and the clay is washed with water to remove the remaining soda ash. This may be done by agitating the clay with water while heating to 185 to 210° F. as when treating with soda ash. The washings are repeated until only a trace of soda ash remains in the clay. It has been found that some two or three washings are sufficient.

If necessary, the clay is then dried, ignited in the usual manner, and ground. It is now substantially as effective as new clay.

During this treatment the oil content of the clay is lowered from about 35% by weight to about 2% by weight, more or less, so that approximately 90 gallons of oil are recovered per ton of clay treated.

The soda ash solution may be brought to strength with dry soda and reused in the treatment of further clay. In operating in this manner soaps which are formed, accumulate in the soda ash solution and may be recovered.

Although the present invention has been described in connection with the details of a specific embodiment thereof, it is not intended that such details shall be regarded as limitations upon the scope of the invention except in so far as included in the accompanying claims.

I claim:

1. The method of revivifying filtering clay from mineral oil filtration which consists in washing the clay with aqueous solution of soda ash while heating to about 180 to 210° F., settling the mixture, removing oil and liquid therefrom, washing the clay with water, and drying and igniting the clay.

2. The method of revivifying oil-laden filter clay used in the treatment of mineral oils by removing substantial quantities of oil together with other matters therefrom, which consists in washing such filter clay with an aqueous alkaline solution of an alkaline substance of the class consisting of alkali metal carbonates, and caustic alkalis.

3. The method of revivifying oil-laden clay used in the treatment of mineral oils, which consists in washing the clay with an aqueous alkaline solution of an alkaline substance of the class consisting of alkali metal carbonates, and caustic alkalis, while heating to about 180 to 210° F. and removing separated oil and alkaline solution therefrom.

4. The method of revivifying clay used in the treatment of mineral oils, which consists in heating the clay with an aqueous alkaline solution of an alkaline substance of the class consisting of alkali metal carbonates, and caustic alkalis, allowing the mixture to settle; removing the clay therefrom, and drying and igniting the clay.

In testimony whereof I have hereunto set my hand this 4th day of May, 1927.

HUGH LOWERY.